(12) United States Patent  
Baudot

(10) Patent No.: US 9,933,576 B2  
(45) Date of Patent: Apr. 3, 2018

(54) ELECTRO-OPTIC DEVICE WITH AN OPTICAL GRATING COUPLER HAVING A GRATING PERIOD VARIATION AND METHODS OF FORMATION THEREOF

(71) Applicant: STMICROELECTRONICS (CROLLES 2) SAS, Crolles (FR)

(72) Inventor: Charles Baudot, Lumbin (FR)

(73) Assignee: STMICROELECTRONICS (CROLLES 2) SAS, Crolles (FR)

( * ) Notice: Subject to any disclaimer, the term of this patent is extended or adjusted under 35 U.S.C. 154(b) by 0 days.

(21) Appl. No.: 14/982,302

(22) Filed: Dec. 29, 2015

(65) Prior Publication Data

US 2017/0184797 A1    Jun. 29, 2017

(51) Int. Cl.

| G02B 6/34 | (2006.01) |
|---|---|
| G02B 6/30 | (2006.01) |
| G02B 6/124 | (2006.01) |
| G02B 5/18 | (2006.01) |
| G02B 6/12 | (2006.01) |

(52) U.S. Cl.
CPC ............. *G02B 6/34* (2013.01); *G02B 5/1857* (2013.01); *G02B 5/1866* (2013.01); *G02B 6/124* (2013.01); *G02B 6/30* (2013.01); *G02B 2006/12061* (2013.01)

(58) Field of Classification Search
CPC .. G02B 6/34; G02B 6/30; G02B 2006/12061; G02B 5/1866; G02B 6/124
USPC ............... 385/14, 24, 33–39; 372/26, 45.01; 359/344
See application file for complete search history.

(56) References Cited

U.S. PATENT DOCUMENTS

| 5,227,625 | A | 7/1993 | Hetzler | |
|---|---|---|---|---|
| 5,657,407 | A | 8/1997 | Li et al. | |
| 6,292,503 | B1 * | 9/2001 | Watanabe | H01S 5/22 372/45.01 |
| 7,397,987 | B2 | 7/2008 | Witzens et al. | |
| 7,738,753 | B2 * | 6/2010 | Assefa | B82Y 20/00 216/2 |
| 8,280,207 | B2 * | 10/2012 | Pinguet | G02B 6/124 385/15 |
| 8,912,581 | B2 * | 12/2014 | Lin | H01L 23/5222 257/259 |
| 9,091,827 | B2 | 7/2015 | Verslegers et al. | |

(Continued)

FOREIGN PATENT DOCUMENTS

WO    0150165 A1    7/2001

OTHER PUBLICATIONS

FEOL oxide under waveguide for photonics chip, An IP.com prior art Database technical Disclosure, date Jul. 2, 2014 pp. 1-4.*

(Continued)

*Primary Examiner* — Akm Enayet Ullah  
(74) *Attorney, Agent, or Firm* — Slater Matsil, LLP

(57) ABSTRACT

An electro-optic device may include a photonic chip including an insulator layer, and a semiconductor layer over the insulator layer and defining an optical grating coupler. The optical grating coupler may have a series of alternating curved ridges and valleys. The optical grating coupler has first and second sides and a medial portion. The medial portion has a medial grating period T based upon a targeting wavelength. One or more of the first and second sides have a side grating period different than T.

24 Claims, 6 Drawing Sheets

(56) References Cited

U.S. PATENT DOCUMENTS

| | | | | |
|---|---|---|---|---|
| 9,397,241 | B2* | 7/2016 | Berini | H01L 31/18 |
| 2010/0246617 | A1* | 9/2010 | Jones | G02B 6/124 |
| | | | | 372/26 |
| 2013/0209026 | A1* | 8/2013 | Doany | G02B 6/4214 |
| | | | | 385/14 |
| 2014/0161385 | A1 | 6/2014 | Lessard et al. | |
| 2014/0268312 | A1* | 9/2014 | Zheng | H01S 5/1028 |
| | | | | 359/344 |
| 2015/0086149 | A1* | 3/2015 | Zheng | G02F 1/025 |
| | | | | 385/2 |
| 2015/0285996 | A1* | 10/2015 | Selvaraja | G02B 6/30 |
| | | | | 385/14 |
| 2017/0003449 | A1* | 1/2017 | Manouvrier | G02B 6/124 |

OTHER PUBLICATIONS

Design of photonic waveguide Gratings for Near-Normal Input/ Output Coupling in Standard CMOS using Polysilicon Gate Material, AN IP. com Prior Art Database Technical Disclosure, Dated Oct. 2011, pp. 1-3.*

Bogaerts, Wim, "Lecture: Coupling Light to Silicon Photonic Circuits," HELIOS, Nov. 2009, 114 pages.

Vermeulen, D., et al. "High-Efficiency Fiber-To-Chip Grating Couplers Realized Using an Advanced CMOS-Compatible Silicon-On-Insulator Platform," Optics Express, Aug. 16, 2010, vol. 8, No. 17, 6 pages.

Wirth, Justin C., "Silicon Grating Couplers for Low Loss Coupling Between Optical Fiber and Silicon Nanowires," Purdue University, Dec. 2011, 78 pages.

* cited by examiner

ELECTRO-OPTIC DEVICE WITH AN OPTICAL GRATING COUPLER HAVING A GRATING PERIOD VARIATION AND METHODS OF FORMATION THEREOF

TECHNICAL FIELD

The present disclosure relates to the field of photonics, and, more particularly, to an electro-optic device and related methods.

BACKGROUND

Integrated optical devices for directly processing optical signals have become of greater importance as optical fiber communications increasingly replace metallic cable and microwave transmission links. Integrated optical devices can advantageously be implemented as silicon on insulator (SOI) optical circuits having compact dimensions at relatively low cost. SOI optical circuits employ integrated waveguide structures formed in the silicon layer of the SOI substrate.

In some applications, optical gratings are formed in the SOI substrate or chip for input-output of the photonic signal. Typically, the optical grating is formed on a major surface of the substrate. Hence, the photonic signal path extends largely perpendicular to the SOI layer. When using the substrate in coupling applications, such as when coupling to an optical fiber, the optical fiber is typically mounted in near perpendicular fashion. The shape and pattern of the optical grating defines the wavelength response of the optical grating.

SUMMARY

Generally speaking, an electro-optic device may include a photonic chip comprising an insulator layer, and a semiconductor layer over the insulator layer and defining an optical grating coupler at a surface thereof. The optical grating coupler may comprise series of alternating curved ridges and valleys. The optical grating coupler may have first and second sides and a medial portion therebetween. The medial portion has a medial grating period T based upon a targeting wavelength. At least one of the first and second sides may have a side grating period different than T. Advantageously, the electro-optic device may have a greater bandwidth.

In some embodiments, the first and second sides may have respective first and second side grating periods being equal. The first and second sides may be symmetric about the medial portion. In other embodiments, the first and second sides may have respective first and second side grating periods being different. The respective first and second side grating periods may be different from the medial grating period by a same amount.

Additionally, the first and second sides may be asymmetric about the medial portion. For example, the semiconductor layer may comprise silicon, and the insulator layer may comprise a buried oxide layer. The electro-optic device may also comprise an optical element defining an optical path above the optical grating coupler.

Another aspect is directed to a method for making an electro-optic device. The method may include forming a photonic chip with a semiconductor layer over an insulator layer, the semiconductor layer having an optical grating coupler at a surface thereof. The optical grating coupler may include a series of alternating curved ridges and valleys. The optical grating coupler may have first and second sides and a medial portion therebetween. The medial portion may have a medial grating period T based upon a targeting wavelength. At least one of the first and second sides may have a side grating period different than T.

DETAILED DESCRIPTION

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout, and prime notation is used to indicate similar elements in alternative embodiments.

Figure 1:
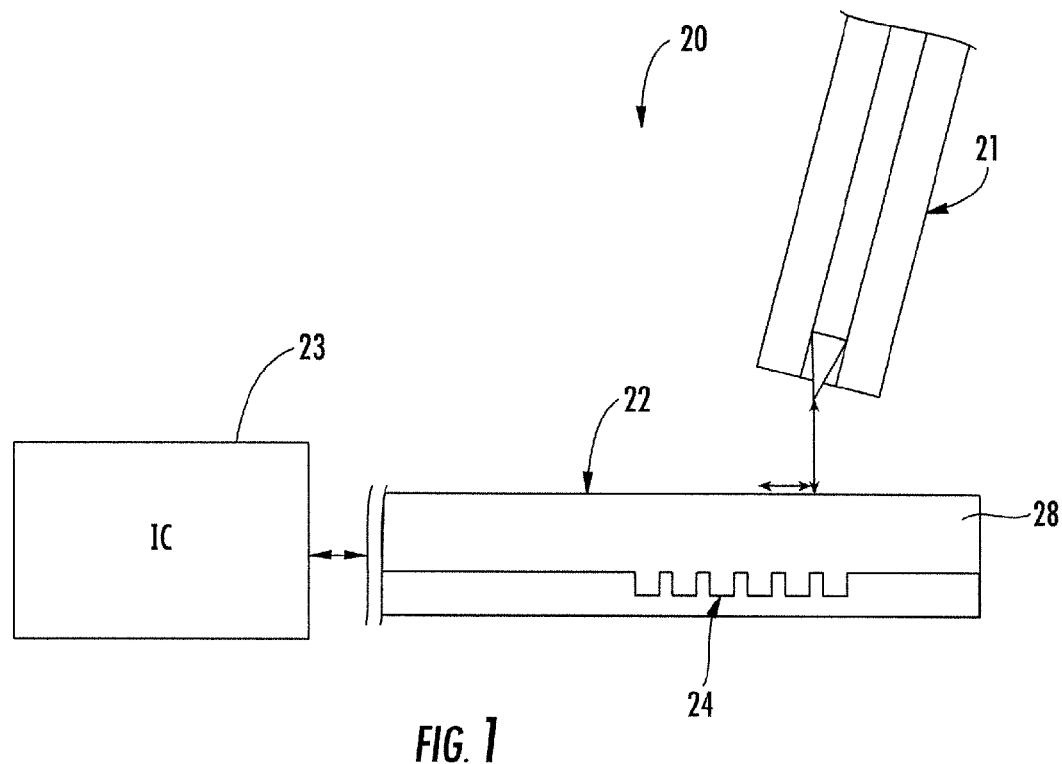
FIG. 1 is a schematic diagram of an electro-optic device, according to the present disclosure.
Figure 2:
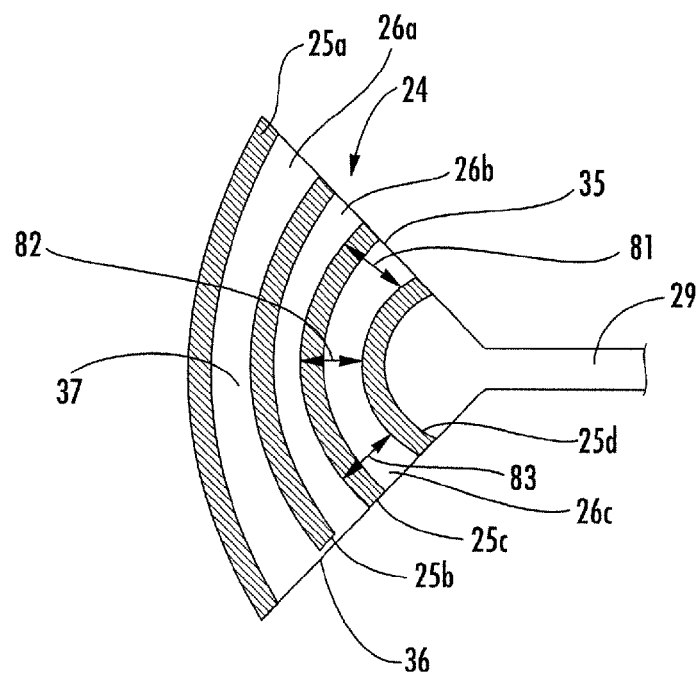
FIG. 2 is a schematic top plan view of an optical grating coupler from the electro-optic device of FIG. 1.

Referring now to FIGS. 1-2, an electro-optic device 20 according to the present disclosure is now described. The electro-optic device 20 illustratively includes a photonic chip 22 having an optical grating coupler (e.g. a single polarization grating coupler) 24 at a surface thereof. The optical grating coupler 24 comprising a series of alternating curved ridges 25a-25d and valleys 26a-26c and defining a path of light propagation. The path of light propagation is substantially perpendicular to the extension of the series of alternating curved ridges 25a-25d and valleys 26a-26c.

The optical grating coupler 24 has first and second sides 35-36 and a medial portion 37 therebetween. The medial portion 37 has a medial grating period T based upon a targeting wavelength λ (i.e. a central operational wavelength). As will be appreciated, the medial grating period T is defined by the spacing between adjacent ridges 25a-25d at the medial portion 37 of the optical grating coupler 24 (i.e. the spacing between grooves in the grating).

Also, for a respective adjacent ridge and valley pair 25a-26a, 25b-26b, 25c-26c, at least one of the first and second sides 35-36 has a side grating period different than T so that the respective adjacent ridge and valley pair 25a-26a, 25b-26b, 25c-26c has a varying respective grating period. In other words, for the respective adjacent ridge and valley pair 25a-26a, 25b-26b, 25c-26c, the spacing varies as the respective adjacent ridge and valley pair progresses from the first side 35 to the second side 36 of the optical grating coupler 24. Also, for each respective adjacent ridge and valley pair 25a-26a, 25b-26b, 25c-26c, the radius of curvature between adjacent ridges changes within a groove.

The electro-optic device 20 illustratively includes an integrated circuit (IC) 23 coupled to the photonic chip 22, and an optical element 21 defining an optical path above the optical grating coupler 24. It should be appreciated that the IC 23 is optional, and could be either on-chip (i.e. a photonic chip) or off-chip. In the illustrated embodiment, the optical element 21 comprises an optical fiber, but could comprise other optical elements, such as a lens or another optical source. The IC 23 may comprise an optical source, such as a semiconductor diode based laser, a processing unit receiving a photonic signal, or a photodiode.

In the embodiment of FIG. 2, the first and second sides 35-36 have respective first and second side grating periods being equal. The first and second sides 35-36 may be symmetric about the medial portion 37, i.e. the grating pattern is symmetric about the medial portion/bisecting line. Also, the respective first and second side grating periods may be different from the medial grating period by a same amount. In particular, the medial grating period has a value of T at point 82 for targeting a wavelength of $\lambda$, and each of the first and second sides 35-36 has a side grating period equal to T+$\delta$T for targeting a wavelength of $\lambda$+$\delta\lambda$ at points 81, 83.

The photonic chip 22 illustratively includes an insulator layer 30, and a semiconductor layer 31 over the insulator layer (i.e. an SOI device) and defining the optical grating coupler 24. For example, the semiconductor layer 31 may comprise silicon, and the insulator layer 30 may comprise a buried oxide layer.

The photonic chip 22 illustratively includes an optical waveguide 29 coupled to the optical grating coupler 24. As will be appreciated, the optical grating coupler 24 has a tapered shaped for converging the photonic signal to the optical waveguide 29.

Also, in addition to the period varying within a single groove of the optical grating coupler 24, the alternating curved ridges 25a-25d and valleys 26a-26c have a "chirp" progression (i.e. apodization) in period moving from a distal (form the optical waveguide 29) edge of the optical grating coupler 24 towards the optical waveguide 29. This provides a wavelength response that is different according to the position and direction of propagation of signal.

Figure 3:
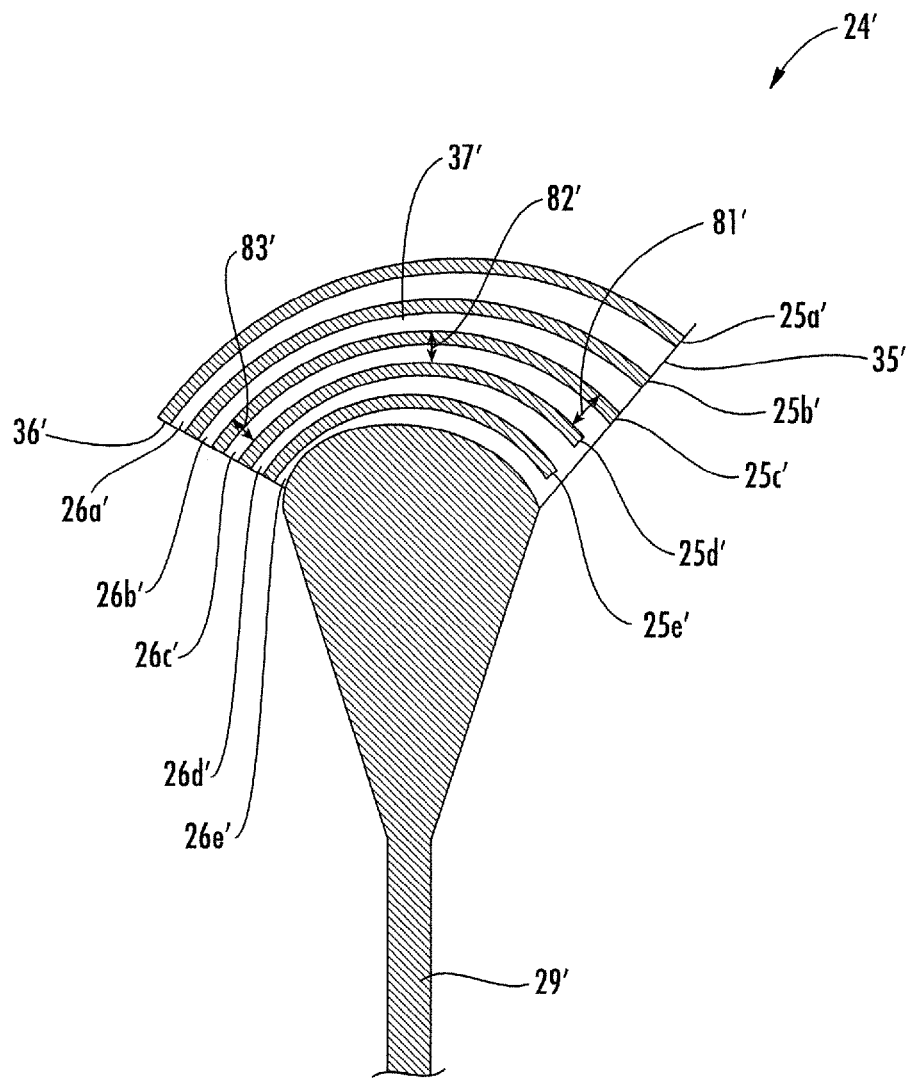
FIG. 3 is a schematic top plan view of another embodiment of the optical grating coupler from the electro-optic device of FIG. 1.

Referring now additionally to FIG. 3, another embodiment of the electro-optic device 20' is now described. In this embodiment of the electro-optic device 20', those elements already discussed above with respect to FIGS. 1-2 are given prime notation and most require no further discussion herein. This embodiment differs from the previous embodiment in that this electro-optic device 20' has the first and second sides having respective first and second side grating periods being different. In particular, the medial grating period has a value of T at point 82', the first side 35' has a side grating period equal to T+$\delta$T for targeting a wavelength of $\lambda$+$\delta\lambda$ at point 81', and the second side 36' has a side grating period equal to T−$\delta$T for targeting a wavelength of $\lambda$−$\delta\lambda$ at point 83'. In other words, the first and second sides 35'-36' are asymmetric about the medial portion/bisecting line 37'.

Referring now to FIGS. 4A-4D, another aspect is directed to a method for making the electro-optic device 20. The method may include forming a photonic chip 22 with a semiconductor layer 31 over an insulator layer 30, the semiconductor layer having an optical grating coupler 24 at a surface thereof. The optical grating coupler 24 may include a series of alternating curved ridges 25a-25d and valleys 26a-26c. The optical grating coupler 24 has first and second sides 35-36 and a medial portion 37 therebetween. The medial portion 37 has a medial grating period T based upon a targeting wavelength. At least one of the first and second sides 35-36 has a side grating period different than T. The method may comprise coupling an IC 23 to the photonic chip 22.

Figure 4A:
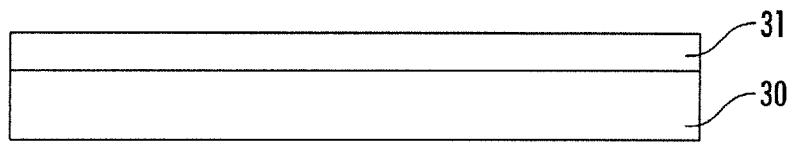
FIGS. 4A-4D are schematic side views of steps of making the electro-optic device of FIG. 1.
Figure 4B:
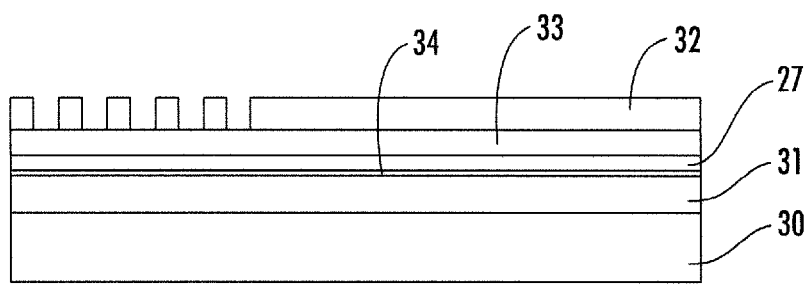
Figure 4C:
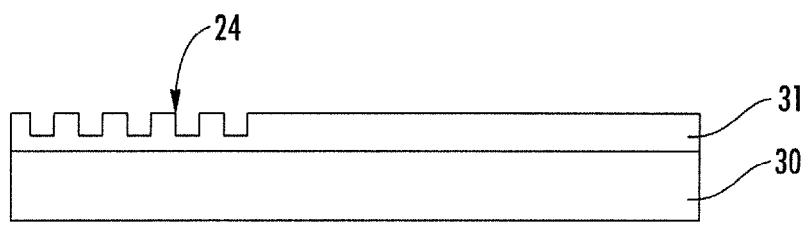
Figure 4D:
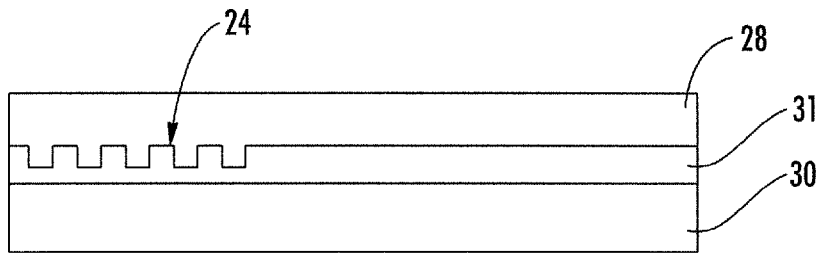

In particular, in FIG. 4A, the method illustratively includes forming the semiconductor layer 31 over the insulator layer 30. In some embodiments, this may comprise forming a silicon-on-insulator wafer. In FIG. 4B, the method includes forming hard mask layers 27, 33-34 over the semiconductor layer 31, and forming a photoresist layer 32 over the hard mask layers and forming openings in the photoresist layer. In FIG. 4C, the method illustratively includes an etching through the openings to define the optical grating coupler 24 in the semiconductor layer 31. In FIG. 4D, the method illustratively includes forming an encapsulation material (e.g. silicon oxide) 28 over the semiconductor layer 31. Advantageously, the optical grating coupler 24 may be manufactured using standard lithography-etch procedures, which may reduce costs.

Figure 5:
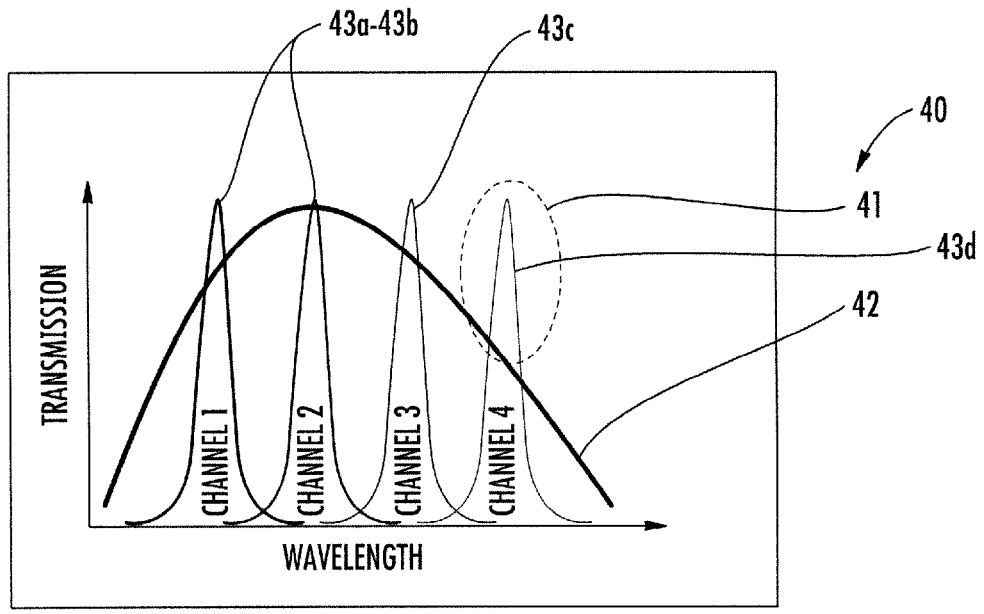
FIG. 5 is a diagram showing spectral performance of an optical coupler, according to the prior art.
Figure 6:
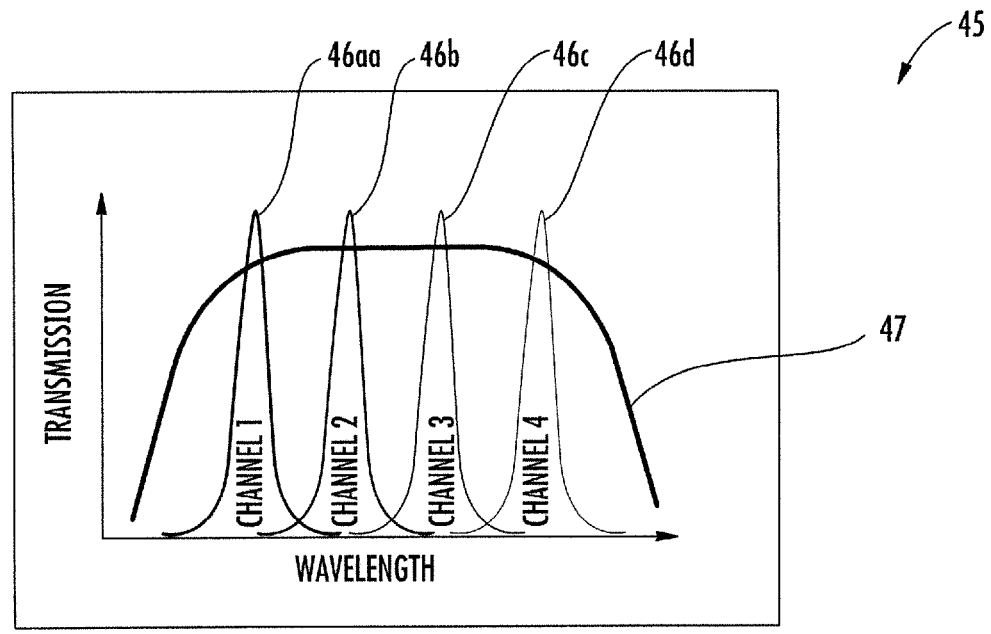
FIGS. 6-10 are diagrams showing spectral performance of an electro-optic device, according to the present disclosure.
Figure 7:
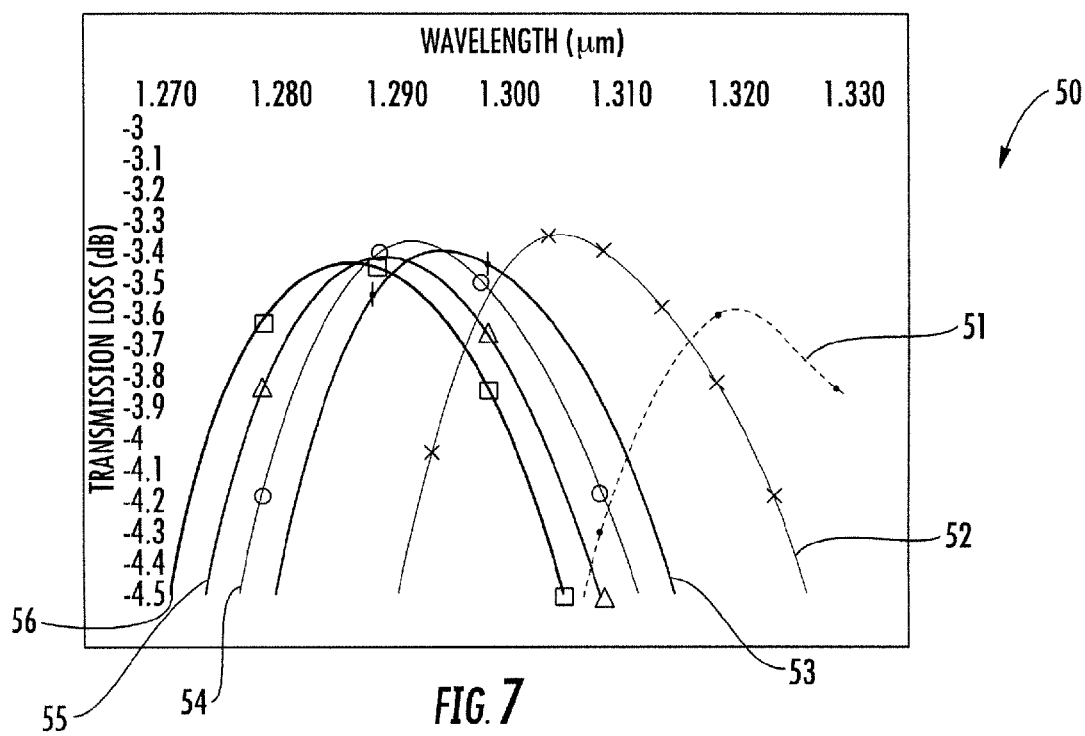
Figure 8:
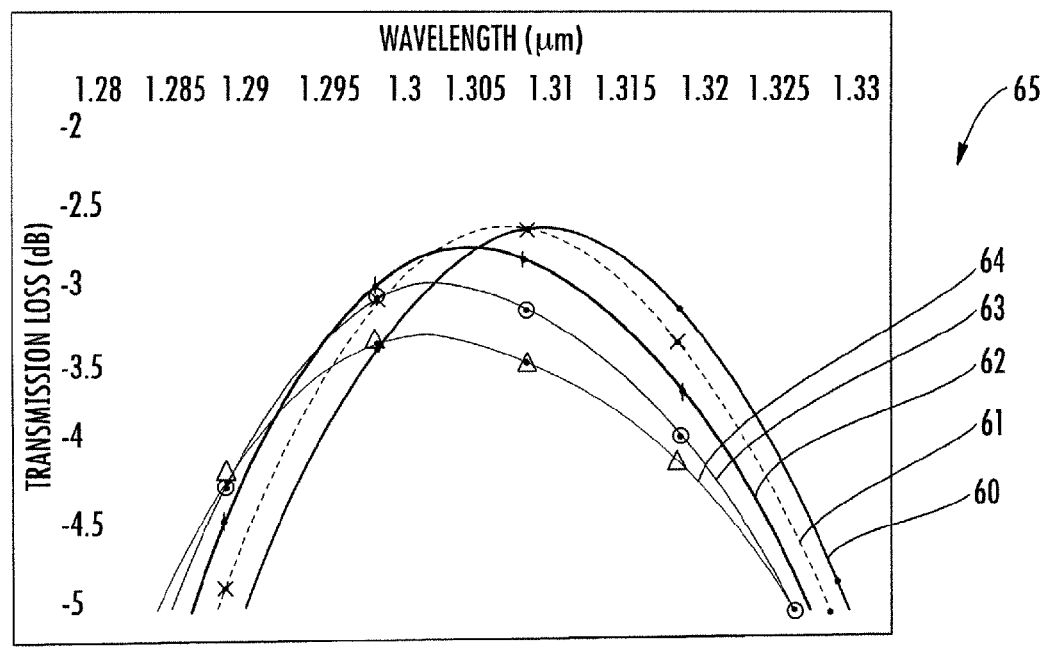
Figure 9:
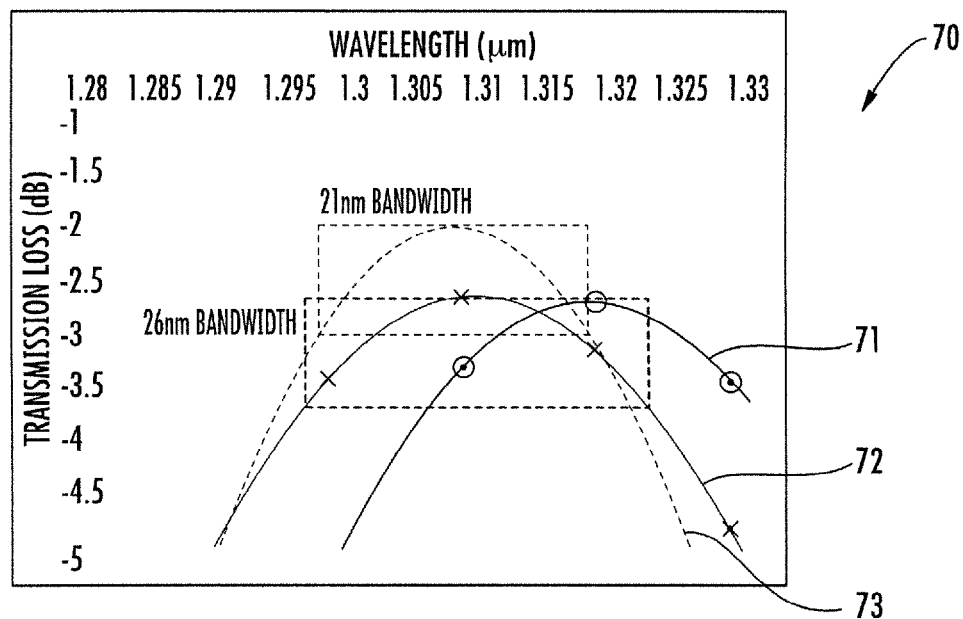
Figure 10:
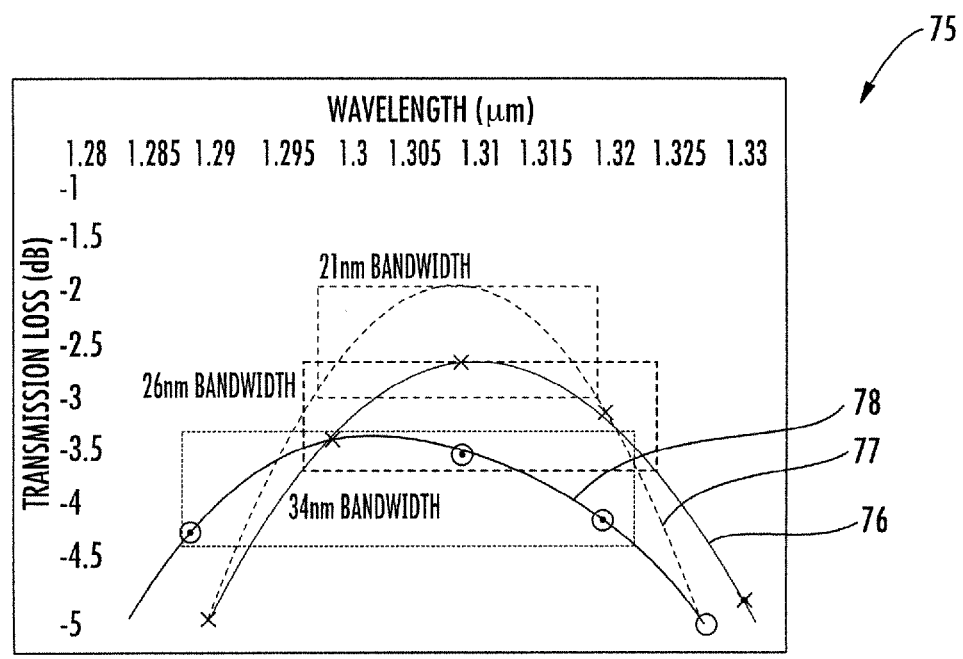

Referring now to FIG. 5, a diagram 40 shows a wavelength response 42 of a typical optical grating coupler. In typical optical grating couplers, the grating period may be static or may change progressively from one valley-ridge pair to another (i.e. each individual valley-ridge pair has a fixed period). Since typical optical grating couplers are optimized for a single wavelength, a potential drawback to these approaches is that the bandwidth of the wavelength response 42 is limited. For example, if four photonic channels 43a-43d are being transmitted, such as in 4-way wavelength-division multiplexing (WDM) applications, one of more channels may be clipped, as noted in the highlighted portion 41.

Referring now to FIGS. 6-10, a diagram 45 shows a wavelength response 47 of the optical grating coupler 24. Helpfully, the four photonic channels 46a-46d are subject to a minor attenuation that is consistent across the spectral range of the channels.

In diagrams 50 and 65, curves 51-56 (51: 474 nm+F=0.54; 52: 474 nm+F=0.46; 53: 474 nm+F=0.40; 54: 474 nm+F=0.38; 55: 474 nm+F=0.36; and 56: 474 nm+F=0.34) show the transmission spectrum of a single period 474 nm grating coupler with respect to changes in fill factor F (ratio between width of the ridges and grating period T) for determining peak wavelength values at a given transmission angle while changing the fill factor. Curves 60-64 (60: 482 nm; 61: 480 nm; 62: 478 nm; 63: 476 nm; and 64: 474 nm) show the transmission spectrum while varying the grating period T for a given fill factor to determine shifts in peak wavelength. A combination of both period and fill factor is necessary to obtain the relevant transmission spectrum at the correct transmission/reception angle.

Diagrams 70, 75 show increased bandwidth in the optical grating coupler 24. In particular, curve 73 shows experimental results for the standard single period optical grating coupler (showing a bandwidth of 21 nm), curve 72 shows a simulation of the same design with applied process bias (showing a bandwidth of 26 nm), and curve 71 shows a simulation of the same design without process bias. In particular, curve 77 shows experimental results for the standard single period optical grating coupler (showing a bandwidth of 21 nm), curve 76 shows the simulation of the standard single period design with applied process bias (showing a bandwidth of 26 nm), and curve 78 shows a simulation of the wideband optical grating coupler 24 with a T=474 nm and a $\delta$T=12 nm. Also, the optical grating coupler 24 is more tolerant to process and temperature variations that affect peak wavelength, bandwidth and loss.

In the simulations, the optical element 21 comprises an optical fiber with: a core diameter of 7.5 μm; a cladding diameter of 125 μm; and an optical fiber height of 15 μm from the optical grating coupler 24. Also, an optical source is coupled to the optical waveguide 29, and the output of the optical fiber is monitored for results.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

That which is claimed is:

1. An electro-optic device comprising:
   a photonic chip comprising an insulator layer, and a semiconductor layer over said insulator layer, the semiconductor layer being structured to define an optical grating coupler; and
   the semiconductor layer comprising a series of alternating curved ridges and valleys, the optical grating coupler having first and second sides and a medial portion therebetween along a top view of the optical grating coupler, wherein the alternating curved ridges in the medial portion have a medial grating period T based upon a targeting wavelength, wherein the alternating curved ridges in the first side have a first side grating period and the alternating curved ridges in the second side have a second side grating period, wherein the first side grating period is different than the medial grating period T.

2. The electro-optic device of claim 1, wherein the first and second side grating periods are equal.

3. The electro-optic device of claim 2, wherein the first and second sides are symmetric about the medial portion.

4. The electro-optic device of claim 1, wherein the first and second side grating periods are different.

5. The electro-optic device of claim 4, wherein the respective first and second side grating periods are different from the medial grating period by a same amount.

6. The electro-optic device of claim 4, wherein the first and second sides are asymmetric about the medial portion.

7. The electro-optic device of claim 1, wherein the semiconductor layer comprises silicon, and wherein the insulator layer comprises a buried oxide layer.

8. The electro-optic device of claim 1, further comprising an optical element defining an optical path above said optical grating coupler.

9. A method for making an electro-optic device, the method comprising:
   forming a photonic chip comprising an optical grating coupler by
      depositing a semiconductor layer over an insulator layer; and
      patterning the semiconductor layer to form a series of alternating curved ridges and valleys, the series of alternating curved ridges and valleys having first and second sides and a medial portion therebetween along a top view of the optical grating coupler, wherein the alternating curved ridges in the medial portion have a medial grating period T based upon a targeting wavelength, wherein the alternating curved ridges in the first side have a first side grating period and the alternating curved ridges in the second side have a second side grating period, wherein the first side grating period is different than the medial grating period T.

10. The method of claim 9, wherein the first and second side grating periods are equal.

11. The method of claim 10, wherein the first and second sides are symmetric about the medial portion.

12. The method of claim 9, wherein the first and second side grating periods are different.

13. The method of claim 12, wherein the respective first and second side grating periods are different from the medial grating period by a same amount.

14. The method of claim 9, further comprising coupling an integrated circuit (IC) to the photonic chip.

15. The electro-optic device of claim 1, wherein the optical grating coupler comprises a single polarization optical grating coupler.

16. The method of claim 9, wherein the optical grating coupler comprises a single polarization optical grating coupler.

17. An optical grating coupler comprising:
   an insulator layer disposed over a semiconductor substrate; and
   a semiconductor layer disposed over the insulator layer, the semiconductor layer comprising a plurality of ridges and a plurality of valleys, wherein adjacent ones of the plurality of ridges are separated by one of the plurality of valleys, wherein the plurality of ridges comprises a first ridge and a second ridge separated by one of the plurality of valleys, wherein the plurality of ridges comprise a first end and an opposite second end along a top view of the optical grating coupler, wherein the first ridge is separated from the second ridge by a first distance at the first end, wherein in a mid-region between the first end and the second end, the first ridge is separated from the second ridge by a second distance different from the first distance.

18. The optical grating coupler of claim 17, wherein the first ridge is separated from the second ridge by a third distance at the second end, wherein the first distance is equal to the third distance.

19. The optical grating coupler of claim 18, wherein, from the first end to the second end, the optical grating coupler is symmetrical through the mid-region.

20. The optical grating coupler of claim 17, wherein the first ridge is separated from the second ridge by a third distance at the second end, wherein the first distance is different than the third distance.

21. The optical grating coupler of claim 20, wherein the first distance is different from the second distance by a first amount, and the third distance is different from the second distance by the first amount.

22. The optical grating coupler of claim 21, wherein the first distance is smaller than the second distance, and the second distance is smaller than the third distance.

23. The optical grating coupler of claim 20, wherein, from the first end to the second end, the optical grating coupler is asymmetrical through the mid-region.

24. The optical grating coupler of claim 17, wherein the semiconductor layer comprises silicon, and wherein the insulator layer comprises a buried oxide layer.

* * * * *